United States Patent [19]
Marsh

[11] 3,943,332
[45] Mar. 9, 1976

[54] COOKING DEVICE
[75] Inventor: Richard Eugene Marsh, Geneva, Ill.
[73] Assignee: Marsh Products, Inc., Geneva, Ill.
[22] Filed: Dec. 20, 1974
[21] Appl. No.: 534,906

Related U.S. Application Data
[63] Continuation of Ser. No. 398,657, Sept. 19, 1973, abandoned.

[52] U.S. Cl. .................. 219/520; 99/358; 219/200
[51] Int. Cl.² ......................................... H01H 3/06
[58] Field of Search .......... 219/200, 201, 383, 384, 219/492, 524, 525; 99/331, 339, 340, 351, 358, 375, 383

[56] References Cited
UNITED STATES PATENTS
3,383,218    5/1968    Jason et al. ..................... 219/200 X
3,632,962    1/1972    Cherniak ............................ 219/200

Primary Examiner—J. D. Miller
Assistant Examiner—Fred E. Bell
Attorney, Agent, or Firm—Leo J. Aubel

[57] ABSTRACT

A device utilizing thermal and electrical energy for cooking food in a minimal time, particularly pieces of food in a flat configuration such as meat patties or hamburgers, steaks, and bacon.

6 Claims, 4 Drawing Figures

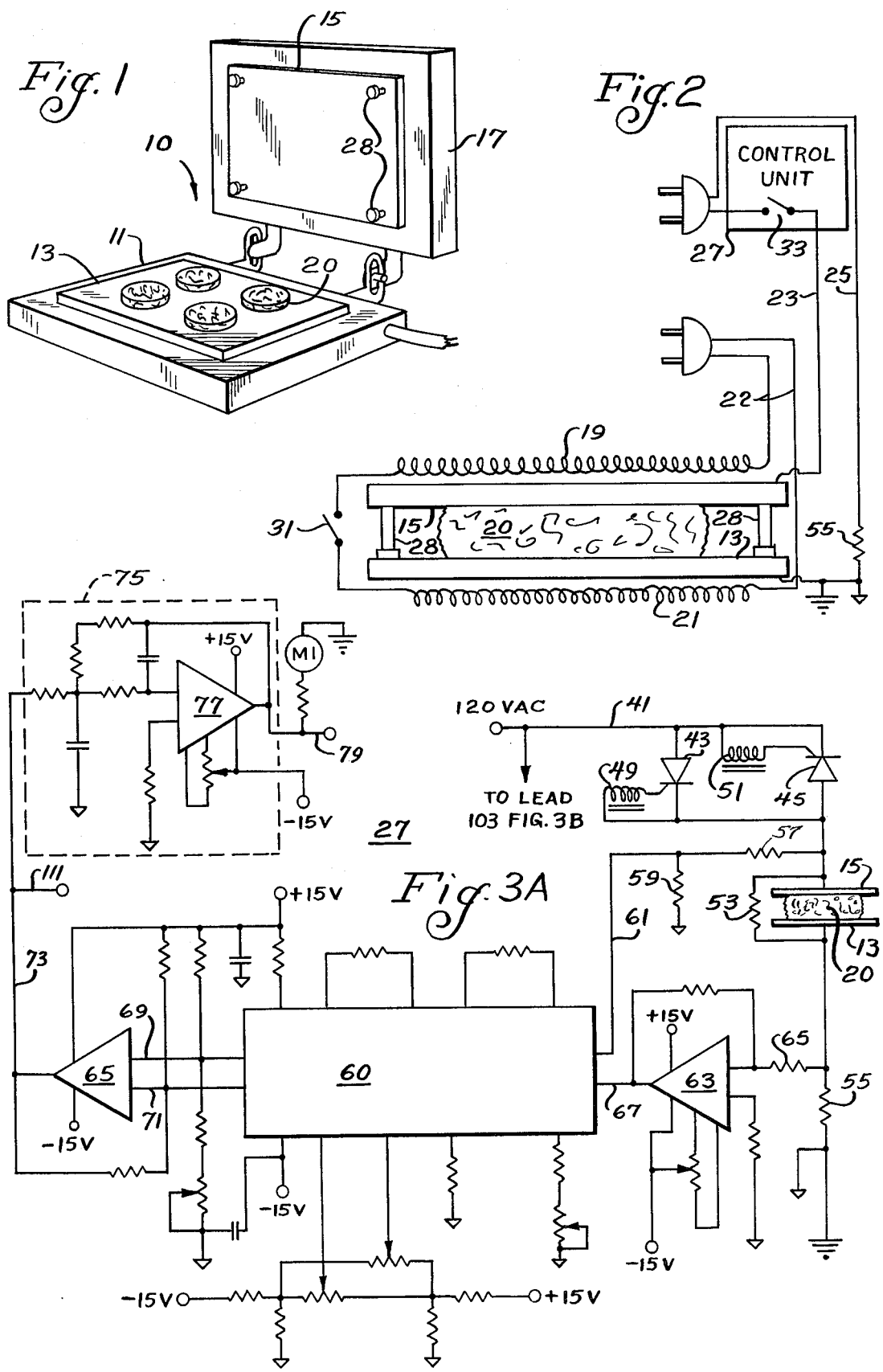

COOKING DEVICE

This is a continuation of application Ser. No. 398,657, filed Sept. 19, 1973, now abandoned.

BACKGROUND OF THE INVENTION

A number of devices are known for quickly heating or cooking foods in a relatively short time; an example of such structures are shown in U.S. Pat. No. 3,474,221; U.S. Pat. No. 3,167,431 and U.S. Pat. No. 1,915,962. There is, however, a need to provide a system and apparatus for cooking food such as meat patties or hamburgers quickly while retaining the palatability of the food. Another need is that of providing an automatic unit that will cook hamburgers more quickly and uniformly.

Accordingly, it is a principal object of the present invention to provide a new device for cooking foods and particularly for grilling meat patties such as hamburgers.

The apparatus and method of the present invention has been found to cook the food more quickly than conventional methods, to provide a more uniformly cooked food, and to cook the food with less weight loss than results when cooking the same food by conventional apparatus. It has further been found that the apparatus of the invention cooks the food as fast or faster than the present microwave ovens and also browns the food to have a very pleasing appearance.

Also, and of importance, is the fact that the apparatus of the invention provides a cooked food product which is more flavorful; that is, it tastes better than conventionally cooked foods. It is believed that one reason for this fact is that since the meat patty is cooked more quickly it thus retains or seals a greater percentage of the meat juices within the meat during the cooking process than is done by conventional apparatus, resulting in a juicer piece of meat.

Another reason why the cooked meat patty is believed to be more flavorful is the fact that the apparatus of the invention cooks the food more uniformly throughout its thickness than is done by conventional apparatus. To cook, say a meat patty, in conventional apparatus, a higher temperature has to be established in those layers of the meat near the surfaces in order that the center layers of the meat be properly cooked. This is believed to cause the outer layers of the meat to become relatively overcooked, dry; and, hence less juicy. In contrast to the foregoing, the present invention provides an apparatus wherein the entire thickness of the food (excluding the exterior visible surfaces) is cooked uniformly throughout to provide juicer and tastier pieces of meat. Present day cuisine and eating habits require that the exterior visible surfaces of the meat be relatively brown; this too is accomplished by the inventive apparatus.

The apparatus of the present invention possesses another important feature in that it does not use any high frequency energy or microwaves which might be injurious to the user if leakage of the high frequency energy is not prevented. Thus, the cooking device of the invention may be used safely and without any special protecting features such as required in microwave ovens. Further, food such as a meat patty may be cooked by the apparatus of the present invention as fast or faster than the time required by microwave ovens for cooking the same food.

The foregoing and other objects, features and advantages of the invention will be apparent from the following more particular description of a preferred embodiment of the invention as illustrated in the accompanying drawings wherein:

DESCRIPTION OF THE DRAWINGS

FIG. 1 shows one embodiment of the invention wherein the cooking device includes cooking plates positioned in a hingeable closeable unit;

FIG. 2 shows an electrical diagram useful in explaining the invention; and,

FIGS. 3A and 3B show a diagram of the control circuitry of the invention.

DESCRIPTION OF THE INVENTION

Figure 3B:
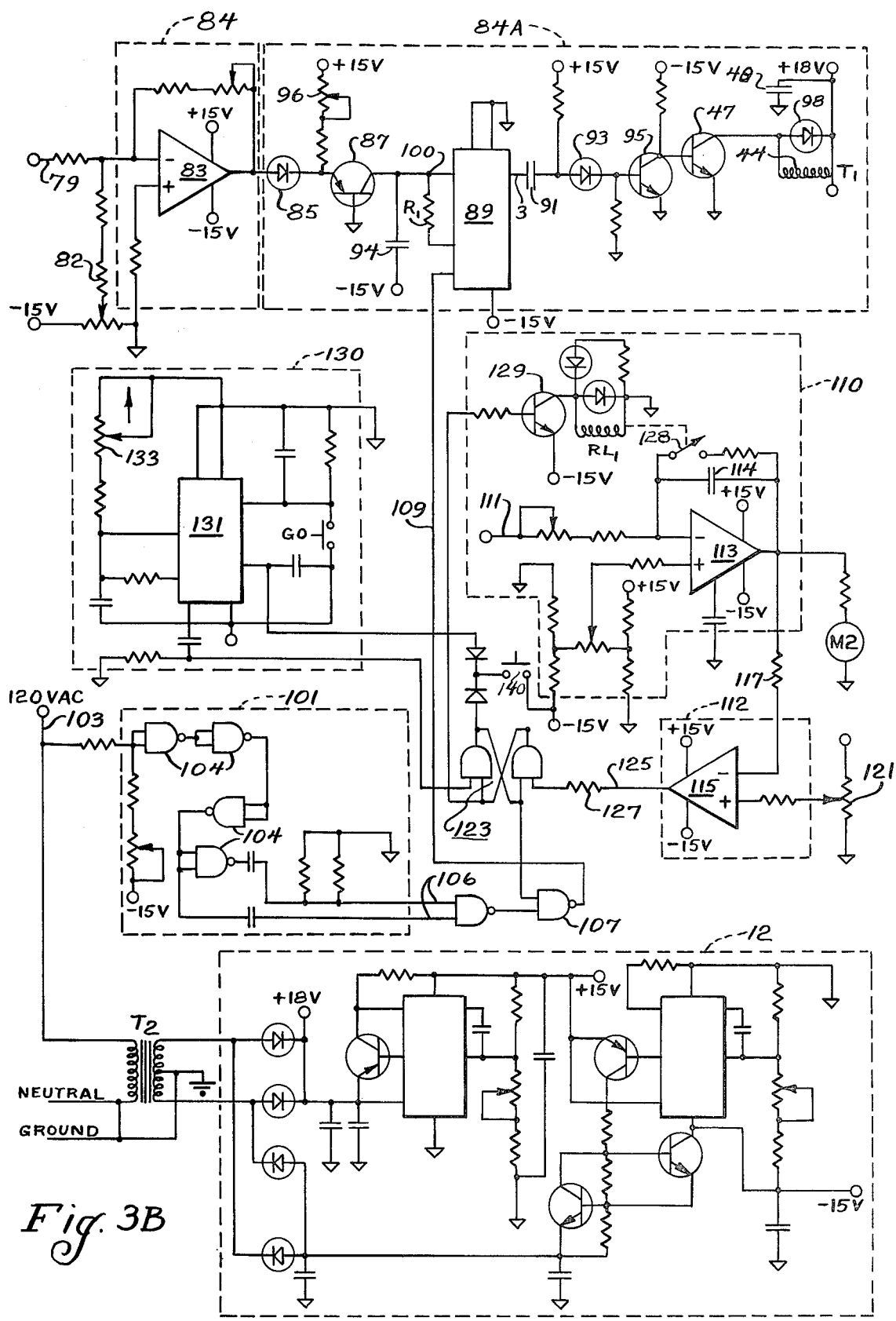

Referring to FIG. 1 and FIG. 2, the cooking device 10 of FIG. 1 includes a base 11 on which is mounted a first or lower plate 13 (such as of steel) having substantial thermal capacity. A second or upper plate 15, which is substantially similar to plate 13, is mounted on the cover 17 which cover is positioned on base 11 to form a hingeable, closeable unit.

Device 10 includes suitable, well known, heating elements 19 and 21 respectively mounted adjacent to plates 13 and 15 in the base 11 and in cover 17 such as indicated in FIG. 2, to heat the upper and lower plates. Alternatively, the heating elements 19 and 21 may be mounted directly on, or within the plates 13 and 15. As is common, heating elements 19 and 21 may be connected to a source of alternating current, through leads 22. Preferred embodiments of the cooking device are presently adapted to operate from generally available 120 volt or 240 volt A.C. sources.

Plates 13 and 15 are electrically connected through leads 23 and 25 to a control unit 27 which will be described in detail hereinbelow, and thence to the same A.C. source. Plate 13 is connected to neutral or the grounded side of the line, and plate 15 is insulated. Plate 15 also includes adjustable insulator spacing studs 28 for limiting the minimum distance between the plates 13 and 15 when the plates are closed in an operating position, as indicated in FIG. 2. As is obvious, the one embodiment of the cooking device shown in the FIGURES is generally similar to a hinged waffle iron, or griddle.

In operation, the meat patties (hamburgers) to be cooked are placed on the lower plate 13 of the cooking device as indicated in FIG. 1. The inventive apparatus operates equally weel whether the pattie is in a frozen or unfrozen state. As is common, power is initially applied to preheat the plates 13 and 15 such as through a conventional thermostat switch 31 connected to heating elements 19 and 21. Note of course, that the inventive apparatus is useful in cooking foods, particularly food products shaped in a flat configuraton such as steaks, bacon, liver, etc.

When the plates are closed as indicated in FIG. 2, to initiate the cooking process, a suitable electronic switch, shown pictorially as a mechanical switch at 33, is activated after a preset time, as will be described more fully hereinbelow, so as to connect the source of electrical power through the control unit 27, switch 33, conductive lead 23, plate 15, meat patty 20, plate 13 and conductive lead 25 back to the source of power. As will be explained, meat patty 20 is in effect an electrical, series-connected resistance in the foregoing circuit.

Refer now to FIGS. 3A and 3B which show the schematic diagram of the control unit 27. In FIG. 3A, the 120 volt alternating current is coupled through lead 41 and selectively through silicon controlled rectifiers (SCR's) 43 and 45, and hence to plate 15. As mentioned, the patty 20 acts as an electrically resistive element, hence the foregoing current path is traceable from plate 15, through patty 20, plate 13, and current shunt resistor 55 to neutral and ground references.

A safety bleeder resistor 53 is connected across plates 13 and 15 to shunt the SCR leakage current when the SCR's are normally OFF, so that no significant voltage extist across the plates at such time.

SCR's 43 and 45 each include an anode, a cathode and a gate electrode and are connected in a relatively inverse relation; that is, the anode of SCR 43 and the cathode of SCR 43 are connected to the input line 41. Accordingly, the SCR's conduct on opposite half cycles of the input alternating current. The gate electrodes of SCR's 43 and 45 are connected to the secondary windings 49 and 51, respectively, of transformer T1. The primary winding 44 of transformer T1 is shown on the upper right hand corner of FIG. 3B. Transformer T1 functions as a gate pulse transformer having its primary winding actuated in conjunction with the control circuitry.

As will also be explained more fully, the SCR's 43 and 45 are phase controlled to adjust the firing or conductance angle of the SCR's to maintain a constant rate of energy input to the meat patty 20. If the rate of energy starts to go above whatever is a pre-set level, the conductance angle of the SCR's is reduced; and conversely, if the rate of energy input tends to drop below the pre-set level. the conductance angle is increased.

The output from SCR's 43 and 45 is also coupled through resistor 57 and lead 61; and across resistor 59 to provide a voltage input to an analog multiplier integrated circuit 60 (such as an MC1495L of the Motorola Co.). The foregoing voltage input to circuit 60 is representative of the voltage being applied to the meat patty 20. A second input to the analog multiplier circuit 60 is coupled from the junction of plate 13 and resistor 55 through resistor 65 and an operational amplifier 63, (such as a Signetics Co. 741 type). The foregoing second input on lead 67 to analog multipler 60 is representative of the current through the meat patty.

The analog multiplier 60 multiplies the signal input on lead 61, which is proportional to the voltage developed across the patty, and the signal input on lead 67 which is proportional to the current passing through the patty to thus provide an output which is representative of instantaneous wattage input to the meat patty. The output of analog multiplier 60 is coupled through leads 69 and 71 to an operational amplifier 65 (a Signetics Co. 741 type). As will be appreciated, the voltage at the output of operational amplifier 65 pulsates in accordance with the conduction of SCR's 43 and 45 and hence at twice the repetition rate of the input current. In order to obtain the average wattage input to the meat patty over a short period of time, the output from operational amplifier 65 is coupled through lead 73 to a low pass active filter 75 including an operational amplifier 77 (a Signetics 741 type) to provide a D.C. voltage proportional to the short term average power input to the meat patty. The active filter 75 functions to remove the short term pulsations and provide a varying D.C. voltage having a level proportional to the average wattage dissipated in the meat patty.

The output of operational amplifier 77 is connected through lead 79 (refer particularly to the upper left hand corner of FIG. 3B), to an error signal circuit 84 including an operational amplifier 83 (a Signetics 741 type). The D.C. voltage at the output of error signal circuit 84 is connected to a control circuit 84A comprising serially connected diode 85, transistor 87, timer unit 89 (a Signetics Co. NE555V type), capacitor 91, diode 93, transistors 95 and 47, the primary winding 44 of transformer T1 and capacitor 48 to reference potential. A diode 98 is connected across primary winding 44.

Error signal circuit 84 and control circuit 84A are effective to adjust conduction angle of the SCR's to maintain a constant wattage input to the meat patty.

Manually adjustable potentiometer 82 at the input of operational amplifier 83 sets or establishes a desired, controlled rate of energy input to the meat patty. In the embodiment shown, potentiometer 82 is connected to a negative voltage (−15V) tending to cause amplifier 83 to provide, say, a positive output while the input on lead 79 to amplifier 83 is positive to cause amplifier 83 to provide a negative output. Thus, the voltage on amplifier 83 will tend to go toward zero, in response to an input on lead 79 at which point there will be minimal or zero power input to the meat patty.

Note that at this point, a timing capacitor 94 connected to the junction of transistor 87 and timer unit 89 will be charged from the +15 potential through resistor 96 and transistor 87. When the output of amplifier 83 is zero, capacitor 94 will take a relatively long time to charge and thus to activate the timer unit 89. Accordingly, the output of timer unit 89 will pulse transformer T1 to trigger the SCR's near or toward the end of each half cycle, hence the SCR's will conduct for a minimum period, or not at all, and little if any power will be applied to the meat patty. Note that timer unit 89 includes a second input lead 109 which is in effect an ON-OFF control for the timer unit, as will be explained hereinbelow.

If the output of amplifier 83 is positive; that is, the voltage on lead 79 is less than the potentiometer 82 pre-set voltage, it is an indication that the average wattage input to the meat patty is less than desired. In this instance, the capacitor 94 will be charged by current flowing through amplifier 83 as well as by current potential flowing through resistor 96. Accordingly, capacitor 94 will be charged relatively faster and consequently, the timer circuit 89 will be activated relatively sooner and cause the pulse transformer T1 to trigger the SCR's earlier in the conduction cycle thereby increasing the conduction period of the SCR's and hence increasing the power applied to the meat patty.

Refer now to the left center of the drawing of FIG. 3B, to the pulse circuit generally labeled 101. Pulse circuit 101 comprises suitable known logic units such as NAND units, generally labeled 104. Circuit 101 converts the 120 volts A.C. input coupled thereto to provide at its output on leads 106, essentially square synchronizing pulses each time the line voltage goes through zero. The synchronizing pulses from circuit 101 are coupled through NAND circuit 106, NAND gate circuit 107, and lead 109 to the timer unit 89. The power to the meat patty is turned OFF by interrupting the synchronizing pulses on lead 109, and more specifically by turning OFF NAND gate 107. The gate 107 is turned ON and OFF by flip-flop circuit 123 as will be explained.

When the synchronizing pulses coupled from gate 107 to the timer unit 89 are cut OFF, timer unit 89 will be OFF, transformer T1 will not be pulses, and the SCR's will be turned OFF. In this condition only leakage current will flow through leads 23 and 25 and safety bleeder resistor 53 to ground thus bypassing plate 13 and 15 to prevent any build up of voltage across plates 13 and 15 during such condition.

A time delay circuit 130 including a timer unit 131 (also a Signetics NE55V type) similar to the timer unit 89 is pre-settable by potentiometer 133 to provide a time delay of between 10 to 30 seconds after the GO switch is closed and before a power is turned ON to the meat patty. In other words, when the operator pushes the GO start button, there is a pre-set time delay before electrical energy is applied to the meat patty.

At this point, it may be well to explain that it is a combination of the thermal heat applied to the meat patty 20 by the thermal elements 19 and 21, and the electrical energy directly applied to the patty, which provides the desirable cooking results. The plates 13 and 15 are preheated by the heating elements 19 and 21 and the plates store a relatively high amount of thermal energy. When the patties, one or more, are placed between the plates 13 and 15, the plates discharge substantial thermal energy to the meat patties. During the cooking period, the thermal discharge rate of the plates is higher than the thermal heating rate provided by the heating elements to the plates.

The thermal energy from the plates softens the meat patty and makes for better electrical contact between the plates and the patty. The heating of the meat also tends to lower the resistance of the patty; and very importantly the heated plates also cause the meat patty to brown to make it culinarily attractive. Salt applied to the meat also improves the electrical contact and conductivity of the meat. Thus, as explained above, the meat patties are initially heated by thermal energy for a pre-set time, then electrical energy is also applied thereto.

Referring again to FIG. 3B, an integrator circuit 110 integrates the wattage applied to the meat patty and when the total electrical energy (the total number of joules), reaches a pre-set level, the power is switches OFF.

The integrator circuit 110, which includes an operational amplifier 113, (a National Semiconductor LM308 type) receives an output on lead 111 from the operational amplifier 65 (see also lead 111 on FIG. 3A). Since, as mentioned above, the pulse output from operational amplifier 65 represents the instantaneous rate of electrical energy input to the meat patty, integration of these pulses provides a voltage at the output terminal of amplifier 113 which is proportional to the total electrical energy input to the meat patty at any given moment.

A comparator circuit 112 including an operational amplifier 115 (a Signetic 741 type) receives the output from operational amplifier 113 through resistor 117 and lead 119. A reference voltage level is coupled to the other input of operational amplifier 115 from a manually controllable potentiometer 121 to represent the total desired electrical energy into the meat patty. The setting on potentiometer 121 thus sets the total electrical energy to be applied to the meat patties, and hence how "well done" the meat patties are to be cooked.

More specifically, operational amplifier 115 compares the voltage from operational amplifier 113, representative of the total electrical energy input to the meat patty at any given moment, with a pre-set voltage on potentiometer 121. When the voltages are equal, the operational amplifier 115 couples a signal through lead 125 and resistor 127 to re-set the flip-flop circuit 123 to the OFF condition. As mentioned above, when flip-flop 123 is shifted to its OFF condition, a signal is applied through lead 141 to turn OFF gate 107 and cut OFF the syncronizing pulses to timer unit 89 and thereby cause SCR's 43 and 45 to be turned OFF to thereby turn OFF the power applied to the meat patty.

The relay RL1 included in integrating circuit 110 is energized through transistor 129 to close contacts 128, when flip-flop 123 switches to its OFF condition, thereby discharging the integrating capacitor 114 connected across operational amplifier 113. Capacitor 114 is thus returned to its discharged condition after each cooking operation.

A stop push button 140 is provided to enable the operator to couple the −15 potential to turn OFF gate 107 and interrupt toe sunchronizing pulses to thereby turn OFF the power to the meat patty, if so desired, before the circuitry determines that the meat patty is done.

A meter M1 may be connected to the output of operational amplifier 77 to enable the operator to monitor the average wattage input to the meat patty. A second meter M2 may be connected to the output of operational amplifier 113 to indicate the total energy input to the meat patty.

The lower portion of FIG. 3B shows a power supply 12 which may be of any suitable known type to provide the indicated D.C. voltages.

While the invention has been particularly shown and described with reference to preferred embodiments thereof, it will be understood by those skilled in the art that various changes in form and details may be made therein without departing from the spirit and scope of the invention.

What is claimed is:

1. An electrical energy cooking device for cooking food, comprising, in combination, first and second plate electrodes positionable in spaced relation to one another for forming a cooking compartment of predetermined minimum thickness, means for heating said plates to thereby pre-heat the said plates to transfer heat from said plates to said food placed therebetween, and first and second electronic control means connected to said electrodes to selectively couple electrical energy by means of said electrodes through said food, said first electronic control means controlling the total electrical energy applied to said food in response to a selected level, and said second electronic control means controlling and maintaining the rate at which said electrical energy is applied to said food relatively constant at a selected level during a selected cooking period.

2. An apparatus as in claim 1 wherein said control means provides a pre-set time delay after said heat transfer is initiated before the electrical energy is applied to said food.

3. An apparatus as in claim 1 wherein said control means include current control means, first circuit means for providing a voltage representative of the voltage being developed across said electrodes, second circuit means for providing a current representative of current being coupled to said electrodes, multiplier means for receiving said representative voltage and current to provide a voltage proportional to instantaneous power input to said food.

4. Apparatus as in claim 3 further including filter means for receiving said proportional voltage and providing a voltage indicative of the average power input to the food during a given period of time, and means to connect said voltage indicative of the average power input to control the conduction of said current control means and thereby the rate of power input to the food.

5. An apparatus as in claim 4 wherein said cooking devide operates from a source of alternating current energy, means to provide pulses in synchronism with the alternating current for controlling the conduction of the current control means, integrating means for providing a signal representative of the integration of the power input to said food, comparator means for comparing the total electrical energy input to the food with a pre-selected input level to turn OFF said synchronized pulses when said total electrical energy input equals the pre-selected input level to thereby turn OFF the power input to said food.

6. An apparatus as in claim 1 wherein said first electronic means includes means for integrating the electrical energy applied to the food during the selected cooking period and means for switching off the power when the selected level of total electrical energy is attained.

* * * * *